US007007045B2

(12) United States Patent
Starbuck

(10) Patent No.: US 7,007,045 B2
(45) Date of Patent: Feb. 28, 2006

(54) PRESERVING MEMORY RESOURCES BY LIMITING TIME-DATE INFORMATION FOR A SUBSET OF PROPERTIES

(75) Inventor: Bryan T. Starbuck, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 175 days.

(21) Appl. No.: 10/878,095

(22) Filed: Jun. 28, 2004

(65) Prior Publication Data

US 2005/0246399 A1 Nov. 3, 2005

Related U.S. Application Data

(63) Continuation of application No. 10/835,830, filed on Apr. 30, 2004.

(51) Int. Cl.
*G06F 17/30* (2006.01)

(52) U.S. Cl. ........................ 707/203; 707/10; 707/201; 709/236; 709/248

(58) Field of Classification Search .............. 707/1–10, 707/100–104.1, 200–206; 709/240, 236, 709/248
See application file for complete search history.

(56) References Cited

U.S. PATENT DOCUMENTS 6,052,735 A 4/2000 Ulrich et al. ............... 709/236
6,212,529 B1 * 4/2001 Boothby et al. ............ 707/201
6,295,541 B1 * 9/2001 Bodnar et al. .............. 707/203
6,324,544 B1 11/2001 Alam et al. ................. 707/201
6,442,570 B1 8/2002 Wu ............................ 707/201
6,463,427 B1 10/2002 Wu ............................... 707/3
6,505,214 B1 1/2003 Sherman et al. ............ 707/201
6,799,190 B1 * 9/2004 Boothby ..................... 707/204
2003/0005342 A1 1/2003 Thomas et al. ............. 713/400
2003/0046434 A1 3/2003 Flanagin et al. ............ 709/248

OTHER PUBLICATIONS

Son, S.H., et al., "A Token-Based Synchronization Scheme for Distributed Real-Time Databases," Information Systems, Sep. 1993, vol. 18, pp. 375-389.*

(Continued)

*Primary Examiner*—Shahid Alam
*Assistant Examiner*—Jean Bolte Fleurantin
(74) *Attorney, Agent, or Firm*—Workman Nydegger

(57) ABSTRACT

Example embodiments provide for preserving memory resources by selecting property values to be assigned time-date information used in resolving conflicts between sync values. The property values may be selected based on the available resources of a remote device, e.g., when the time-date information is to be stored in a field of limited space. Further, the property values may be selected based on historical information, such as the most recently or frequently modified values. Other example embodiments also provide for storing an upper and/or lower boundary of time-date information for the remaining property values not selected. For example, the most recently modified property time-date value may be used for the upper boundary and the oldest modified time-date value may be used for the lower boundary.

30 Claims, 7 Drawing Sheets

OTHER PUBLICATIONS

U.S. Appl. No. 10/835,830, filed Apr. 30, 2004, Starbuck.
U.S. Appl. No. 10/878,717, filed Jun. 28, 2004, Starbuck.
Ming, Xiong, et al., "MIRROR: A State-Conscious Concurrency Control Protocol for Replicated Real-Time Databases," Information Systems, vol., 27, Issue 4, Jun. 2002, pp. 277-297.
Bhalla, S., "The Performance of an Efficient Distributed Synchronization and Recovery Algorithm," Journal fo Supercomputing, vol. 19, Issue 2, Jun. 2001, pp. 199-219.
Son, S.H., et al., "A Token-Based Synchronization Scheme for Distributed Real-Time Databases," Information Systems, vol. 18, Issue 6, Sep. 1993, pp. 375-389.
Sinha, M.K., "Commutable Transactions and the Time-Pad Synchronization Mechanism for Distributed Systems," IEEE Transactions on Software Engineering, vol. SE-12, Issue 3, Mar. 1986, pp. 462-476.

* cited by examiner

PRESERVING MEMORY RESOURCES BY LIMITING TIME-DATE INFORMATION FOR A SUBSET OF PROPERTIES

CROSS-REFERENCE TO RELATED APPLICATIONS

This is a continuation of U.S. patent application Ser. No. 10/835,830 filed Apr. 30, 2004.

BACKGROUND OF THE INVENTION

1. The Field of the Invention

The present invention generally relates to synchronizing data within a distributed computing system. More particularly, the present invention provides for preserving memory resources by limiting time-date information for a subset of properties, the time-date information used for resolving conflicts between sync values.

2. Background and Related Art

Laptop, handheld, and other portable computers or computing devices have increased in popularity as the devices become smaller in size and less expensive. Additionally, improved operating speed and processing power of portable computers has increased their popularity. Many portable computers are capable of storing multiple application programs, such as address books, games, calculators, and the like. The application programs can be permanently installed in the portable computer during manufacture (e.g., on Read-Only Memory (ROM)). Alternatively, one or more application programs may be installed by the user after purchasing the portable computer.

With the increased popularity and computing power of such devices, people are beginning to store data and applications using more than just a single computing device. Many people, for example, often use laptop computers in addition to their regular desktop computer. Other devices such as cellular telephones, Personal Digital Assistance (PDAs), Internet services, and the like are also used for storing data and applications.

Each of these computing devices may be part of a distributed computing system wherein related information can be correlated and stored on multiple such devices. For example, a user may have a digital address book stored on their desktop work computer, on their PDA, on their cell phone, on an Internet service, etc. Accordingly, while at work, it may be convenient for the user to access contact information, which may include phone numbers and other general contact information. While away from work, however, the user may be able to use the address book in a mobile form such as a personal digital assistance (PDA) or other mobile information storage system. Ideally, the contact information of the PDA should match the contact information at the desktop work computer.

When the same or related information is stored in two places, it is possible for the data to change in one location and not in the other. This problem may be overcome through synchronization, which is an automated process that attempts to ensure that each device within the distributed system has the most current information or data. Synchronization, however, has its own set of problems. For example, when synchronization is initialized between the two devices, current systems detect changed property values by comparing corresponding property values from each device. Such comparison, however, gives no indication as to which device made the change. As such, when a property change has occurred on either device, a conflict occurs and a conflict resolution process must be performed.

Other systems mark a changed property with a tag indicating that a change has occurred, e.g., "change," "delete," "add," or other tag, as appropriate. In such systems, however, when two devices start syncing, a local device can create these markers in memory after comparing the data for what needs to be applied. Further, because the tags are only tracked in memory, these tags are not stored in a remote database for use during synchronization with other devices. In other words, conflicts must first be reconciled and then the properties can be marked and tracked in local memory only.

Typically, conflicts can be resolved through comparing metadata associated with the property values that give, e.g., time-date information. The latest time-date information is considered the most up-to-date information and the properties can be updated accordingly. Resolving a conflict by comparing time-date information becomes particularly problematic when the data to be synchronized does not include time-date information, which is referred to as low fidelity data. For example, many smaller computing devices have limited physical resources and are incapable of maintaining time-date information for properties of a data structure item. As such, when a computer syncs data in from such low fidelity device, it doesn't know when the user originally set that property. This prevents the computer from syncing in a property from another computing device and confidently using "last-writer-wins" resolution logic to pick the most up-to-date property. Further, even if no conflict existed, there is typically no way to sync the property change to the receiving device without a conflict resolution process.

BRIEF SUMMARY OF THE INVENTION

The above-identified deficiencies and drawbacks of current synchronization systems are overcome by the present invention. For example, exemplary embodiments provide for preserving memory resources by selecting property values to be assigned time-date information used in resolving conflicts between sync values.

Example embodiments provide for receiving a plurality of property values from a remote device. A limited set of property values from among the plurality of property values received are selected based on the available resources of the remote device. Further, a set of time-date information from a plurality of time-date information corresponding to the plurality of property values is identified. Each of the property values in the limited set corresponding to a different portion of the set of time-date information and indicating when each of the property values within the limited set where last modified. The different portions of time-date information are then stored in a remote database of the remote device.

Other example embodiments provide that the selection of the limited set of property values may also be based historical information associated with the modification of the plurality of property values. For example, the historical information may be the frequency for which each of the plurality of property values are modified, and the most frequently modified property values may then be selected. Alternatively, or in conjunction, the historical information may be time-date information for the plurality of property values, and the most recently modified property values may then be selected.

Still other example embodiments provide for identifying a portion of time-date information from the above-identified plurality of time-date information for remaining property values not within the limited set of property values. The portion of time-date information corresponding to when one or more of the remaining property values where modified by a user. The identified portion of time-date information may then be stored in one location in the remote database such that the identified portion of time-date information corresponds to all of the one or more remaining property values.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to methods, systems and computer program products for storing and maintaining time-date information for a device that stores properties in a database without a corresponding time-date field. Further, the present invention provides for identifying when data has changed on a remote device. The present invention also provides for selecting a limited set of property values to assign time-date information for preserving restricted or limited memory resources. The embodiments of the present invention may comprise a special purpose or general-purpose computer including various computer hardware, as discussed in greater detail below.

Generally, the present invention provides for a distributed computing system that is capable of associating time-date information with a property value in the database. The distributed computing system has a device that stores properties in a database without corresponding time-date fields, and thus is considered a low fidelity or legacy device. Example embodiments provide that time-date information corresponding to remote property values can be identified and formatted in a standard format parsable by one or more devices in the distributed computing system. The formatted time-date information is sent to the remote database for storage in a field associated with the remote property values. The formatted time-date information can then subsequently be used in resolving conflicts between property values.

Other example embodiments provide for determining when a value for a property on a remote device has changed since the last synchronization of the property between the remote device and a local machine. Moreover, other example embodiments provide for selecting a limited set of property values from among a plurality of property values based on available resources of the remote device.

Reference will now be made to the figures wherein like structures will be provided with like or similar reference designations. It is understood that the drawings are examples of schematic representations of embodiments of the invention, and are not meant to limit or otherwise narrow the scope of the present invention.

Figure 1A:
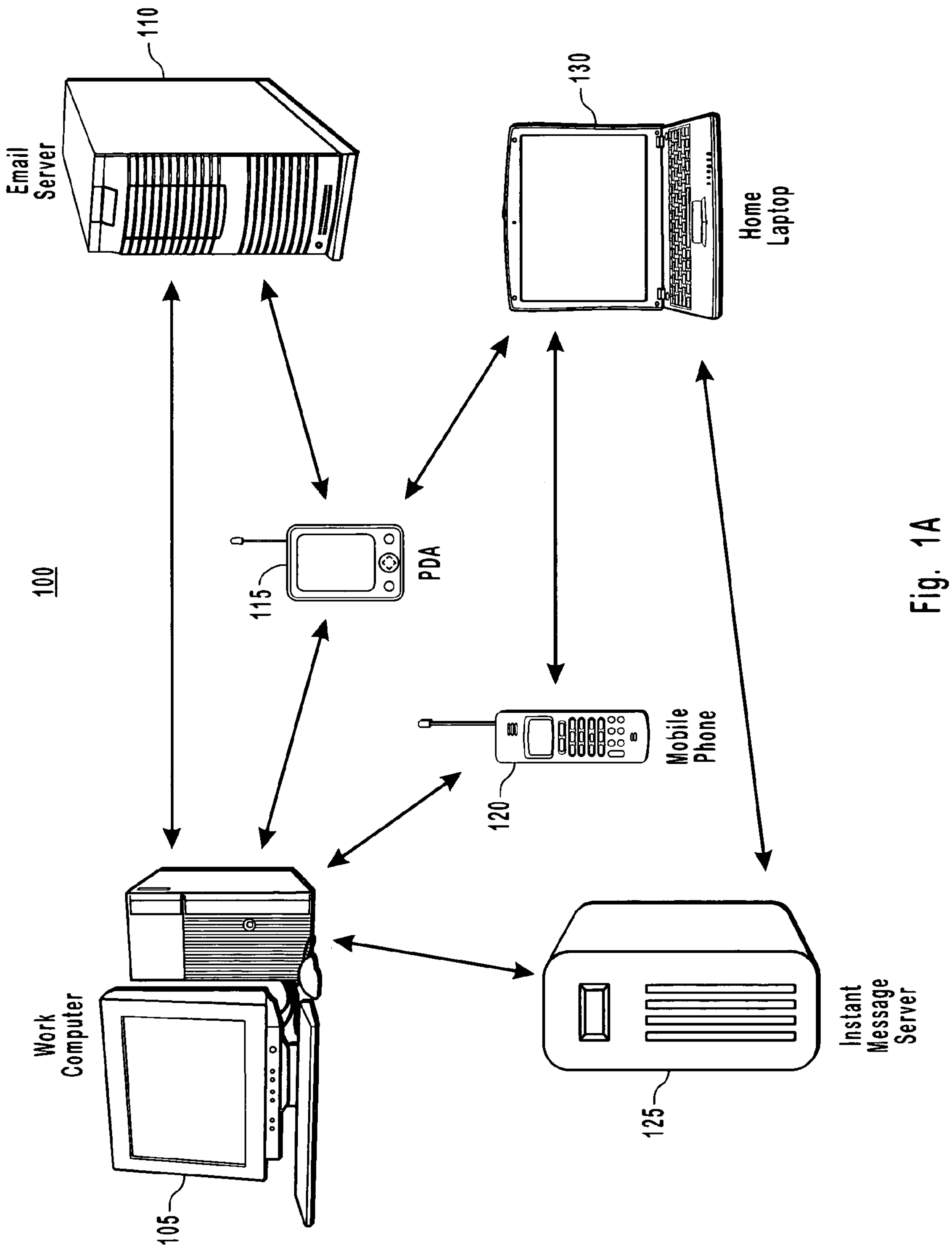
FIG. 1A illustrates a distributed system with high fidelity and low fidelity devices in which the present invention may be implemented.

FIG. 1A illustrates several nodes within a distributed computing network 100 to illustrate the connections and how each node syncs with other nodes within the system. For example, as shown in the distributed computing system 100 work computer 105 can sync with several various devices such as email server 110, PDA 115, mobile phone 120, and instant message server 125. The purpose for synchronizing data within such a distributed computing system 100 is to ensure that the most up-to-date information is provided on all devices used by one or more users.

Data needing to be synchronized may be, e.g., contact information wherein each item would correspond to information about an individual person, company, corporation, or any other similar contact. An example of the properties associated with each contact item may be first name, middle name, last name, company name, address, phone number, email address, website information, etc. As one would recognize, however, the local data may be information other than contact information. For example, the local data could be a calendar and/or scheduling information, a file, an application or any other such information needing to be synced between two devices. Accordingly, reference to contact information is used for illustrative purposes only and is not meant to limit or otherwise narrow the scope of the present invention except where explicitly claimed.

Similar to work computer 105, home laptop 130 may be able to be synced between instant message server 125, mobile phone 120, PDA 115, and email server 110. The distributed computing system 100 may be made up of low fidelity (e.g., a device whose database is not capable of storing time-date information for properties) and high fidelity devices. This is important to consider since ideally every database would have time-date information for each property in an item to indicate the last time the user modified the property. If that was the case, then the sync adapters could use a "last-writer-wins" rule to let the last time-date information pick the winner. This would solve some looping problems and result in the best property winning each conflict (provided the clocks used within the distributed computing system 100 are synchronized as well). Because many distributed computing systems 100 are made up of at least some low fidelity or legacy clients with limited memory resources for storing such time-date information, and because it is desirable to support such legacy clients, there needs to be other ways to resolve conflicts between devices while avoiding potentially infinite sync loops.

Figure 1B:
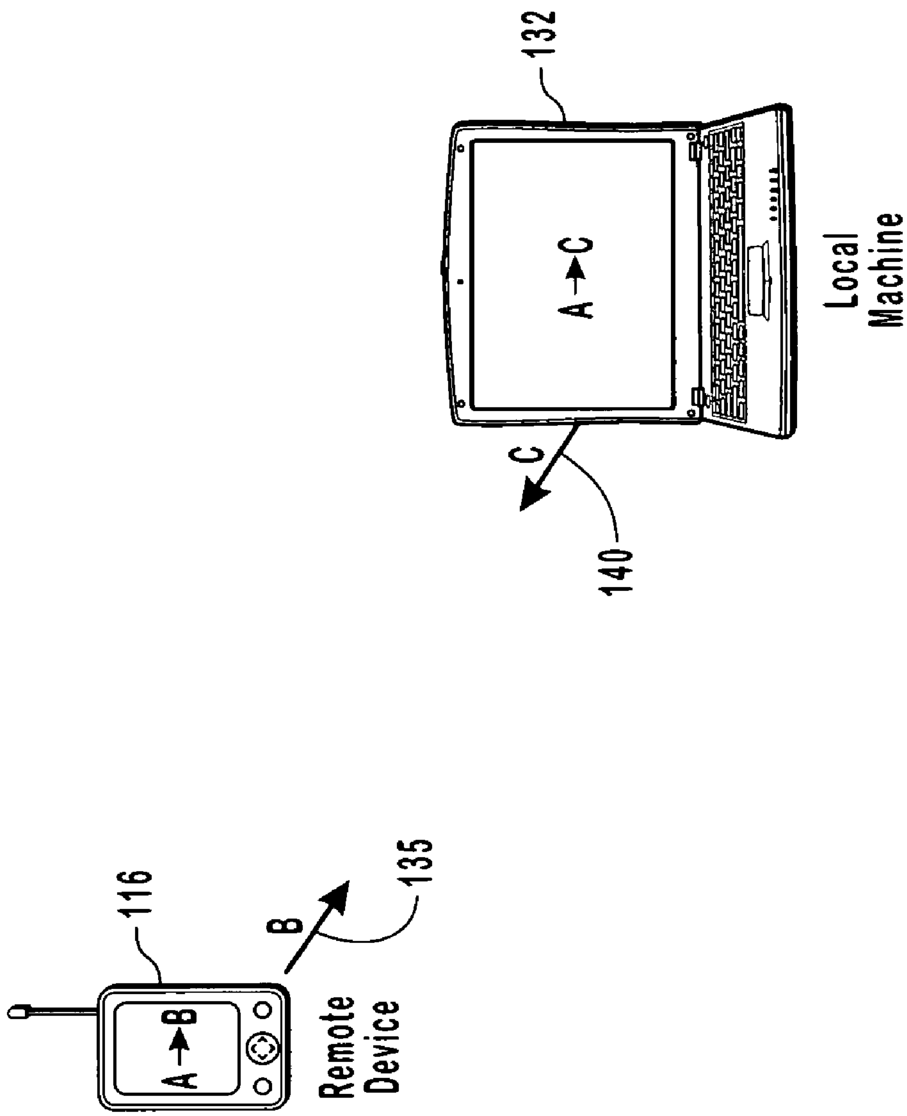
FIG. 1B illustrates the detection of a conflict between two devices within the distributed system in accordance with example embodiments of the present invention.

FIG. 1B illustrates a portion of the distributed computing network 100 with remote devices 116 (such as mobile phone 120 or PDA 115) and a local machine 132 (such as home laptop 130 or work computer 105). As shown, remote device 116 changed a property value from A to B at some point after the last synchronization between remote device 116 and local machine 132. Similarly, local machine 132 changed the same property value from A to C subsequent to the last synchronization between the two devices 116, 132. As such, remote device 116 has a needs sync arrow 135 showing that the value of B for the property should be synced down to local machine 132. Similarly, local machine 132 has a needs sync up arrow 140 indicating that the value of C should be synced up to remote device 115. Because both devices 116, 132 have needs sync arrows to sync property values down and up, respectively, a conflict can result.

As previously mentioned, typically conflicts like the one identified in FIG. 1B can be resolved through the comparison of time-date information associated with the property values. Resolving a conflict by comparing time-date information, however, becomes particularly problematic when the data to be synced does not include time-date information, as in the case of low fidelity devices. This prevents the computer from syncing in a property from another computing device and confidently using "last-writer-wins" resolution logic to pick most up-to-date property. Further, another related problem associated with low fidelity devices is there is no way to identify when a property has changed. Accordingly, even if time-date information can be associated with the low fidelity data, such information or time-date information is potentially unreliable based on the fact that the properties may have been changed at the low fidelity device.

The above-identified deficiencies and drawbacks of current distributed computing networks are overcome through exemplary embodiments of the present invention. For example, the present invention provides for associating time-date information with property values in a database, where a device stores properties without a corresponding time-date field (i.e., a low fidelity device). Further, the present invention provides for determining when a value for a property on a remote device has changed since the last synchronization of the property, even if the remote device is a low fidelity device.

Figure 2:
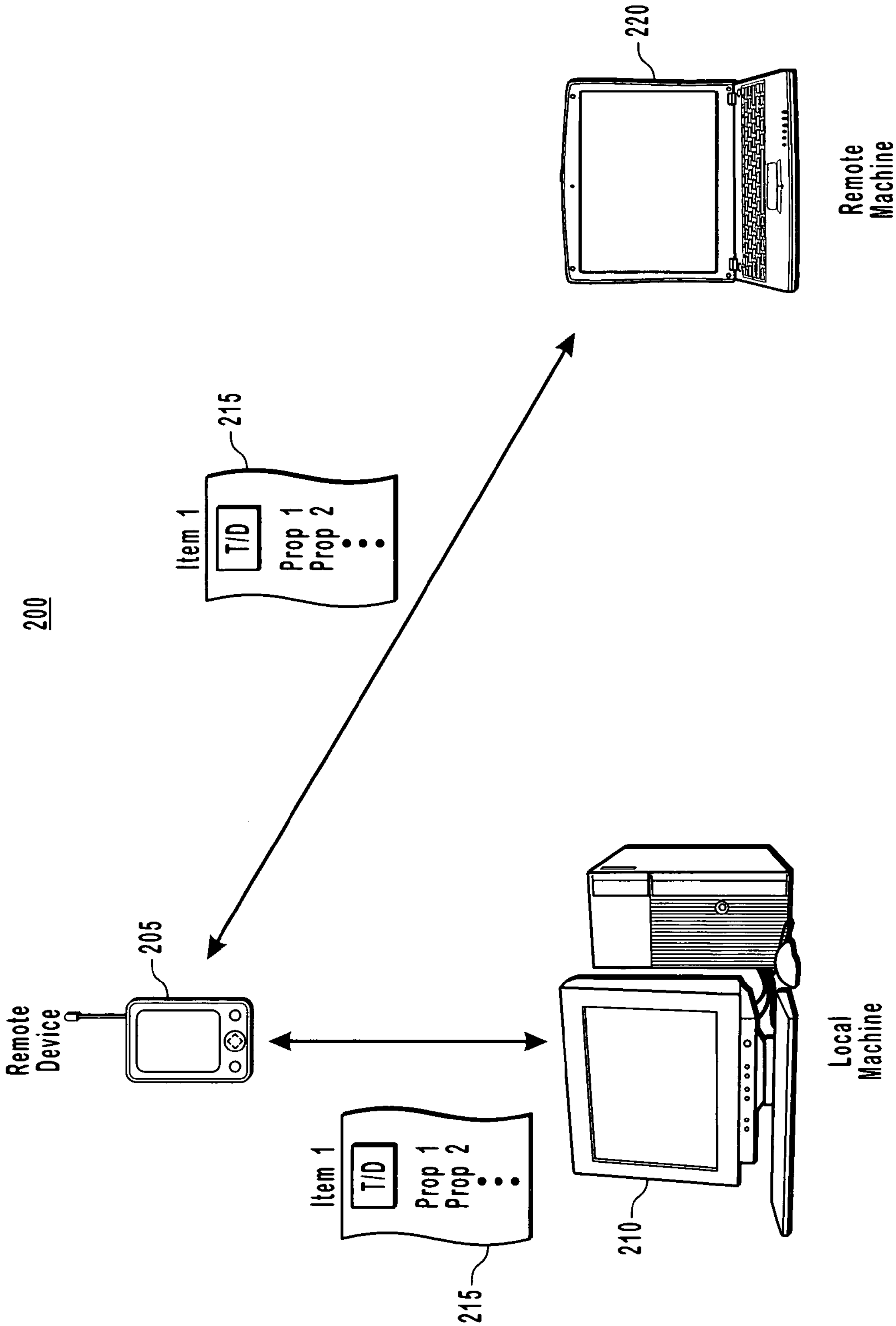
FIG. 2 illustrates updating and use of time-date information in a distributed system with a low fidelity device in accordance with example embodiments of the present invention.

FIG. 2 illustrates a distributed computing network 200 with a system capable of creating, using, and updating time-date information for a low fidelity device in accordance with example embodiments of the present invention. Distributed computing system 200 includes two high fidelity machines, local machine 210 and remote machine 220. Also included within the distributing computing system 200 is a low fidelity device, i.e., remote device 205. Remote device 205 is low fidelity in that the database associated with remote device 205 is not capable of storing time-date information with each property. In other words, remote device 205 stores properties in its database without a corresponding time-date field.

Although remote device 205 does not have time-date fields for properties in its database, example embodiments provide for associating the time-date information with the property values in remote device 205 and allowing remote device 205 to store the time-date information in a standard format and within a field that is unused. For instance, local machine 210 can identify time-date information corresponding to remote property values in remote devices 205 database. The identified time-date information may then be formatted in a standard format parsable by several devices within the distributed computing system 200. The standard format may be, e.g., a Uniform Resource Identifier (URI). For instance, URI may be in the form of a Sync Uniform Resource Locator (URL) that identifies the property and includes the identified time-date information associated with each property. As will be described in greater detail below with regard to FIG. 3, this Sync URL format is desirable because it is readily identifiable and parsable by many devices, thus ideal as a standard format.

Local machine 210 can send to remote device 205 the formatted time-date information, which will be stored in a field associated with the remote property values. For example, as shown in FIG. 2, local machine 210 sends item 1 (215) with Time-Date (T/D) information and updated properties when syncing with remote device 205. Remote device 205 then stores item 1 (215) that includes the time-date information. The formatted time-date information is stored in an unused property filed on the remote device 205. For example, remote device 205 can store the formatted time-date information in a normal property, a hidden property, a private expanded property or even appended it to the end of a notes field. It should be noted that although other information may be stored in a property field (e.g., text in a notes field), the present invention refers to such fields as unused because the field is not reserved for storing time-date information. Accordingly, the use of term "unused" property field should be interpreted broadly to encompass any property field not reserved for storing time-date information.

Example embodiments provide that the formatted time-date information can be used for several different purposes, such as resolving conflicts, or identifying when a property has changed. For instance, a sync is initiated between remote device 205 and remote machine 220. Accordingly, item 1 (215) can be sent down to remote machine 220 with the properties and the formatted time-date information. Because the formatting of the time-date information is in a standard parsable format, remote machine 220 can parse the remote time-date information and identify remote time and date information associated with each property. This remote time and date information can then be compared with the remote machine's 220's time-date information in resolving any conflicts between property values.

Other example embodiments provide for detecting when a property has changed at the remote device 205. For example, the formatted time-date information within item 1 (215) may include a representation of the property value last synced with local machine 210 within each segment of the time-date information. The representation may be, e.g., in the form of a hash, which would be a hash of the last synchronized property value that was associated with the time-date information. When remote machine 220 receives item 1 (215) for syncing, the received properties within item 1 (215) can also be hashed using the same standard hash function used to hash the last synced property value. Standard hash functions that may be used include, but are not limited to, SHA-1, MD5, or other similar hash function.

The hash value within the formatted time-date information may be compared with the hash value generated by the remote machine 220. If the values do not match, it can be deduced that the property value associated with the time-date information was changed at remote device 205. Accordingly, the time-date information is potentially unreliable and may therefore be discarded by remote-machine 220. In such instance, because the time-date information is potentially unreliable, a user interface can be provided to the user in order to resolve the conflict. Of course, other ways of resolving the conflict are also available through standard practices well-known in the industry.

It should be noted that the above use of a hash or representation of a property value in order to determine when a change has occurred at remote device 205 is not limited to formatted time-date information. For example, comparison of property representations in order to determine when a property value has changed can be used without time-date information. Such instances would be useful in determining when properties need to be synced down from remote device 205, without having to compare values of the properties stored on remote machine 220. Accordingly, the use of the hash or remote property representation within the Sync URL or formatted time-date information is used for illustrative purposes only is not meant to limit or otherwise narrow the scope of the present invention, unless otherwise explicitly claimed.

Figure 3:
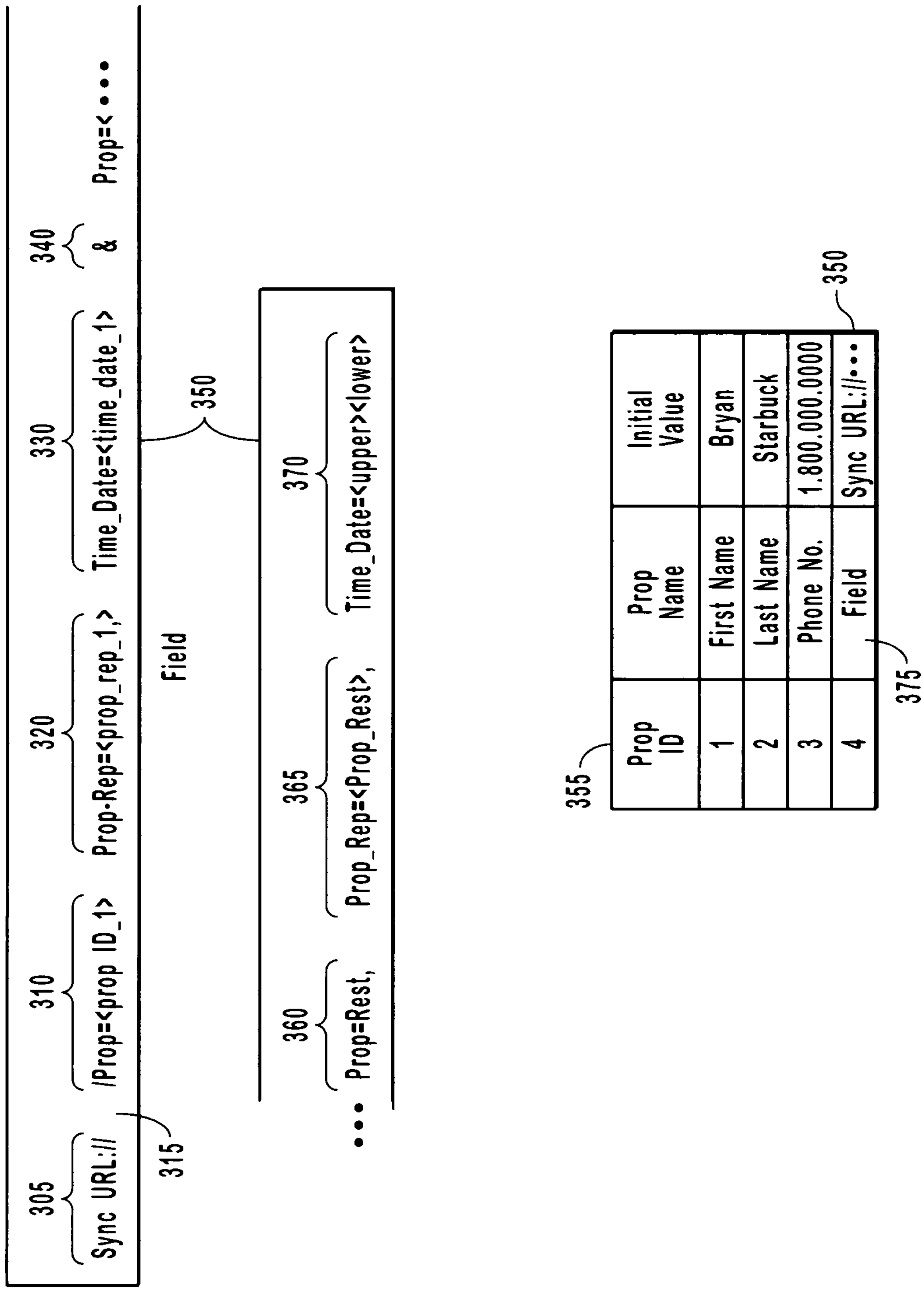
FIG. 3 illustrates an example standard format of time-date information within a field in accordance with example embodiments of the present invention.

FIG. 3 illustrates how time-date information may be formatted and stored at remote device 205. As shown in FIG. 3, item 355 has various fields for a contact, which include property identifiers, property names and an initial value for the properties. Of course, other items, properties, fields, etc. are also available, with the exception of a reserved time-date property field. Accordingly, reference to item 355 contact information and the fields therein are used for illustrative purposes only and are not meant to limit or otherwise narrow the scope of the present invention, except where explicitly claimed.

Also shown in FIG. 3, formatted time-date information can be stored in property field 375 as a field value 350. Example embodiments provide that the formatting may be in the form of Sync URL as shown in field 350. An exploded view of parsed portions of field 350 are also shown in FIG. 3. The first portion of field 350 includes Sync URL 305. This portion identifies to devices that are scanning item 355 that the following segments of the Sync URL include time-date information for various properties within item 355. It is noted, that the place holder 315 normally reserved for locator information in the Sync URL 305 may or may not be used.

Each of the following segments can be separated by an ampersand 340 and identified through a property identification, e.g., property value 310. Also included within each segment of the Sync URL 305 in field 350 is time-date information associated with the property identification (e.g., time_date_1 330 is associated with Prop ID_1). Example embodiments provide that a simple representation of the time-date information may be used in order to conserve valuable memory resources. For example, the time-date information may be stored as a Hexadecimal number. To save further space, the time-date information can also be stored at a lower resolution. For instance, time-date values are normally stored down to a thousandth of a second. Example embodiments, however, provide for creating the formatted time-date information or Sync URL with time-date values stored down to the second or to the minute. In addition, example embodiments provided that the time-date information can be stored in a time zone independent way. Accordingly, this will allow comparable times when the nodes in the sync topology are in different time zones.

Also provided within each segment of the Sync URL 305 is a property representation, e.g., property representation 320. Example embodiments provide that the property representation 320 may be in the form of a hash, which as previously described, can be used in determining if a property value has been changed since the property representation 320 was generated. This indicates whether or not the time-date information 330 is potentially unreliable.

With the exception of few fields, such as the notes field, the memory available to store formatted time-date information is limited. As such, memory for storing time-date information for each and every property may not be available or practical. Accordingly, the present invention provides for determining and choosing a limited set of property values from among the total number of property values within an item 355. A choice of property values to include time-date information within the Sync URL 305 of the present invention may be chosen based on various considerations. For example, the choice may be based on those property values that were most recently changed. Alternatively, the property values chosen to have time-date information associated with them within the Sync URL 305 or formatted time-date information may be based on heuristical data such as the frequency of change for a particular property value. Of course, any other number of various ways for choosing property values to associate time-date information with is also provided. Accordingly, the use of how the properties are chosen, e.g., most recent changed properties, is used for illustrative purposes only and is not meant to limit or otherwise narrow the scope of the present invention unless otherwise explicitly claimed.

Because space is a consideration, and typically a subset of the properties will need to be selected to have time-date information associated therewith, the present invention can also provide for determining if the other properties have changed since a last synchronization, as well as associates time-date information with them, within a reduced space. For example, the present invention provides for representing the rest of the properties in a reduced format and associating upper and/or lower bound time-date information for the representation. For instance, as shown in FIG. 3, appended to the end of the Sync URL 305 in field 350 is a segment with a property identifier 360 holding a rest value. The property identifier 360 indicates to devices that are scanning the Sync URL 305 that the properties that do not have specific time-date information associated with them are presented in this segment. Accordingly, a property representation 365 of the remaining property values can be used.

As with the other property representations previously described, e.g. property representation 320, property representation 365 for the rest of the property values may be in the form of a hash of all the remaining property values. As such, this property representation 365 may be used in a similar way as those previously described property representations to identify when one or more of the remaining property values has changed since the last sync between a remote machine and a local machine. Other example embodiments also provide time-date information 370 can also be associated with the rest property to give an upper and/or lower boundary on when the remaining property values were changed.

Although the rest segment was described as an additional segment of Sync URL, one would recognize that the rest segment may be formatted in its own field. For example, where space or memory needs to be reserved, the rest segment can be used to identify when one or more the properties within an entire item 355 has changed. Accordingly, the use of the rest segment appended to the end of the Sync URL 305 is used for illustrative purposes only and is not meant to limit or otherwise narrow the scope of the present invention except where explicitly claimed.

The present invention may also be described in terms of methods comprising functional steps and/or non-functional acts. The following is a description of steps and acts that may be performed in practicing the present invention. Usually, functional steps describe the invention in terms of results that are accomplished, whereas non-functional acts describe more specific actions for achieving a particular result. Although the functional steps and non-functional acts may be described or claimed in any particular order, the present invention is not necessarily limited to any particular order or combination of acts and/or steps. Further, the use of acts and/or steps in the recitation of the claims and in the following description of the flow chart for FIGS. 4–8 are used to indicate the desired specific use of such terms.

FIGS. 4–8 illustrates example flow charts for various exemplary embodiments of the present invention. The following description of FIGS. 4–8 will occasionally refer to corresponding elements from FIGS. 1B, 2 and 3. Although reference may be made to a specific element from these figures, such elements are used for illustrative purposes only and are not meant to limit or otherwise narrow the scope of the present invention unless otherwise explicitly claimed.

Figure 4:
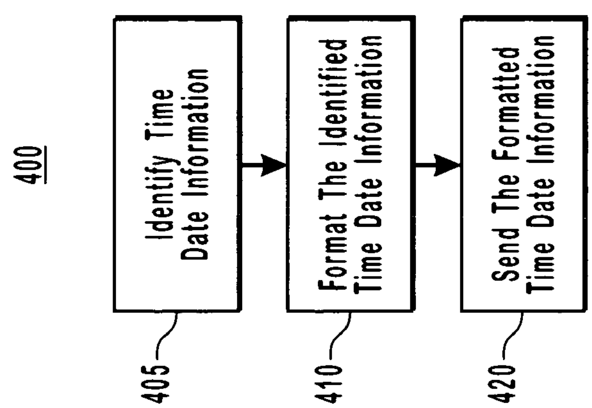
FIG. 4 illustrates a flow chart of a method of associating time-date information with a property value in a database without a corresponding time-date field in accordance with example embodiments.

FIG. 4 illustrates an example flow chart of a method 400 of associating time-date information with a property value within a remote database that stores properties without a corresponding time-date field. Method 400 includes an act of identifying 405 time-date information. The time-date information will correspond to one or more property values in the remote database. Method 400 also includes an act of formatting 410 the identified time-date information. The time-date information is formatted in a standard format parsable by one or more devices 210, 220 within the distributed computing system 200. The standard formatting may be a URI such as the Sync URL 305. The Sync URL 305 may be parsed into segments separated by ampersand 340. Each segment may include a property identifier 310, a representation of the property values 320 and a representation of the time-date information 330 corresponding to the property values. Example embodiments provide the representation for the property values 320 may be a hash of the particular property value. Further, the representation of the time-date information may be a Hexadecimal number and/or can be stored down to the seconds or minutes and/or in a time zone independent format.

Method 400 also includes an act of sending 420 the formatted time-date information. For example, the formatted time-date information may be sent to the remote database for storage in a field 350 associated with the remote property values. The field 350 may be, e.g., a notes field, hidden property, private expanded property, or any other similar unused field.

Other example embodiments provide that the property values that have time-date information associated with them within the field 305 are a subset of the total number of property values. The subset may be chosen based on values associated with the time-date information. For example, the most recent time-date information may be used to select the property values included within the subset. Alternatively, the frequency for which the property values have changed may be used to choose the subset.

In still other embodiments, the remaining portion of property values from the total number of property values may be combined in a representation value 365 and have time-date information associated with it 370. For example, the time-date information 370 may be a most recently changed value for a total number of properties within the rest of the properties. Alternatively, it may also be bounded by a lower time-date information 370 indicating when one of the properties within the remaining portion of property values was earliest in time to be synced. Further, the combined representation value 365 may be in the form of a hash of the remaining portion of property values.

Figure 5:
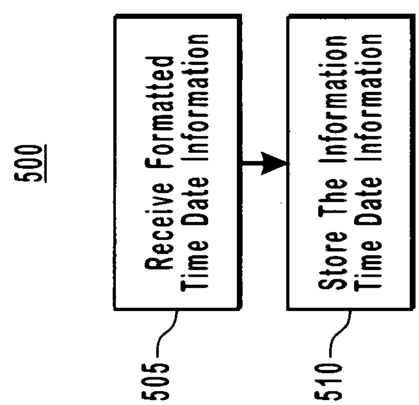
FIG. 5 illustrates a flow chart of a method of receiving and storing time-date information with a property value in a database without a corresponding time-date field in accordance with example embodiments.

FIG. 5 illustrates a method 500 of receiving and storing time-date information with a property value in the database, wherein the properties in a database are stored without corresponding time-date field. Method 500 includes an act of receiving 505 formatted time-date information. Time-date information being associated with property values and formatted in a standard format parsable by one or more devices 210, 220 in the distributed computing system 200. Method 500 also includes an act of storing 510 the formatted time-date information. The time-date information that is formatted may be stored in a database field 350 associated with the property value such that the formatted time-date information can be utilized to resolve data conflicts involving the property values.

Exemplary embodiments also allow for identifying and updating the formatted time-date information. For example, when a property value has changed, the formatted time-date information may be identified as being associated with the property values. This formatted time-date information can then be updated in the database field in accordance with the changed property value. Example embodiments provide that this may be done by the remote device 205 with the appropriate application software. For example, the formatted time-date information may be received and stored on the remote device 205, and a user of the remote device may have made the change. Alternatively, a local machine 210, 220 may have made the change. The local machine 210, 220 storing unformatted time-date information for properties associated with the one or more property values in a database and stores this information within corresponding time-date fields. In other words, the local machine 210, 220 are high fidelity device.

Figure 6:
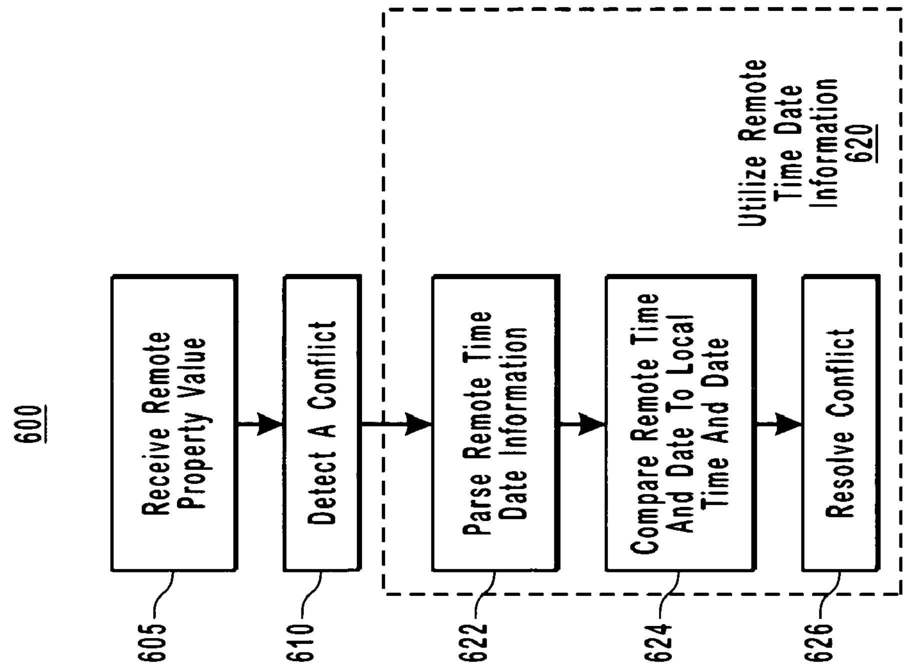
FIG. 6 illustrates a flow chart of a method resolving data conflicts between devices in a distributed computing system using time-date information received from a database without a corresponding time-date field in accordance with example embodiments.

FIG. 6 illustrates a method 600 of resolving a data conflict between devices in a distributed system. One of the devices within the distributed computing system stores properties in a database without a corresponding time-date field. Method 600 includes an act of receiving 605 a remote property value. The remote property value received for a remote property and corresponding remote time-date information is also received. Further, the remote time-date information is formatted in a standard format parsable by one or more devices in the distributed computing system, e.g., URI or Sync URL format. Method 600 also includes an act of detecting 610 a conflict. The conflict is between the remote property value and a corresponding local property value.

Method 600 may also include a functional result-oriented step for utilizing 620 remote time-date information. The time-date information may be utilized to select an appropriate property value to synchronize between a local device and a remote device. A step 620 may include an act of parsing 622 remote time-date information. The remote time-date information parsed according to a standard format to identify the remote time and date, which indicates when the remote property value was changed. Step 620 may also include an act of comparing 624 remote time and date to local time and date. The local time and date indicating when a local property value was changed. Finally, step 620 may include an act of resolving 626 the conflict. The resolution of the conflict will be based on the results of the comparison.

As previously mentioned, a standard format may be in the form of a URI. For example, the URI may be a URL parsed into segments. Segments may include a property identification corresponding to the remote property value, a representation of the remote property value and a representation of the time-date information. Further, the representation of the remote property value may be a hash and the representation of the time-date information may be a Hexadecimal number.

Other example embodiments provide for generating a local representation of the remote property from the remote property value. The local representation may then be compared to the above-mentioned remote representation for determining if the remote property value has changed.

Figure 7:
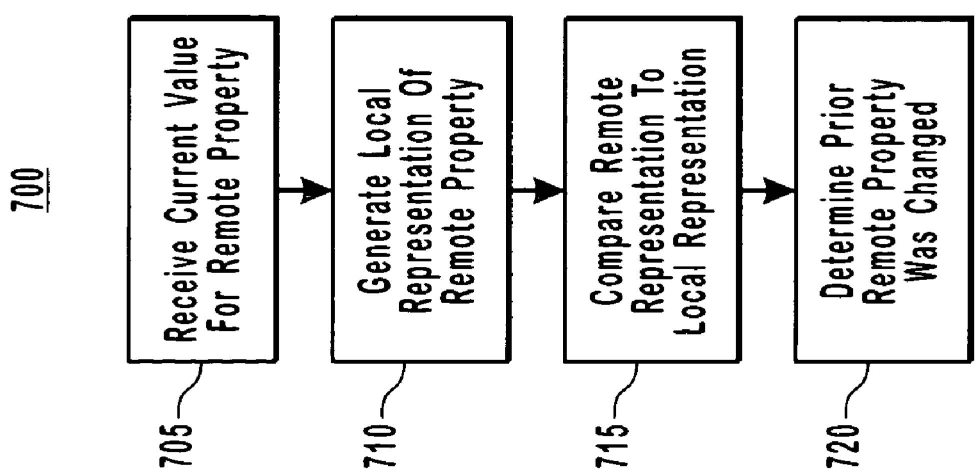
FIG. 7 illustrates a flow chart of a method of determining when a value for a property on a remote has changed since a last synchronization of the property in accordance with example embodiments.

FIG. 7 illustrates a method 700 for determining when a value for a property has changed since a last synchronization of the property between the remote device and a local machine. Method 700 includes an act of receiving 705 a current value for a remote property. Further, a remote representation of a prior value of the remote property is also received. Method 700 may also include an act of generating 710 local representation of remote property. The local representation being generated from the current value for the remote property. Method 700 also includes an act of comparing 715 the remote representation to the local representation. Finally, method 700 includes an act of determining 720 prior remote property was changed. This determination indicates that the property value was changed after the remote representation was generated. Accordingly, if time-date information is associated with the remote property in, e.g., Sync URL 305, such information is potentially unreliable, and it may be discarded.

Figure 8:
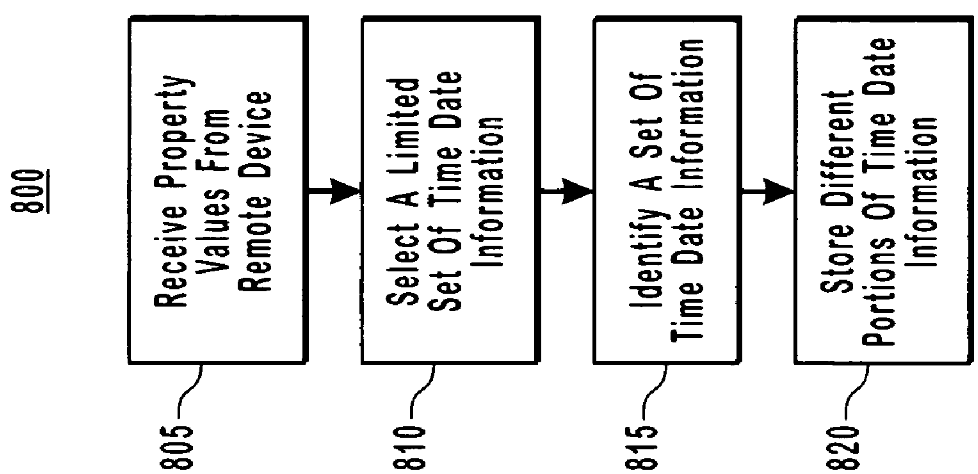
FIG. 8 illustrates a flow chart of a method of selecting a limited set of property values from among a plurality of property values that are to be assigned time-date information in accordance with example embodiments.

FIG. 8 illustrates a method 800 of selecting a limited set of property values from among a plurality of property values. The property values are to be assigned time-date information for a device that stores properties in a database without a corresponding time-date fields. Method 800 includes an act of receiving 805 property values from a remote device. Method 800 also includes an act of selecting 810 a limited set of time-date information. A limited set of property values may be selected from the plurality of property values based on the available resources of the remote device. Method 800 also includes an act of identifying 815 a set of time-date information. Each of the property values in the limited set corresponding to a different portion of the set of time-date information. Method 800 also includes an act of storing 820 different portions of time-date information in a remote database.

Method 800 may also include identifying the remaining portions of property values and storing them as a representation value and associating time-date information with them. For example, a portion of time-date information for the remaining property values may be identified (the remaining property values not being in the limited set of property values). The identified portion of time-date information may be stored in one location in the remote database such that the identified portion of time-date information corresponds to all of the remaining property values.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 9:
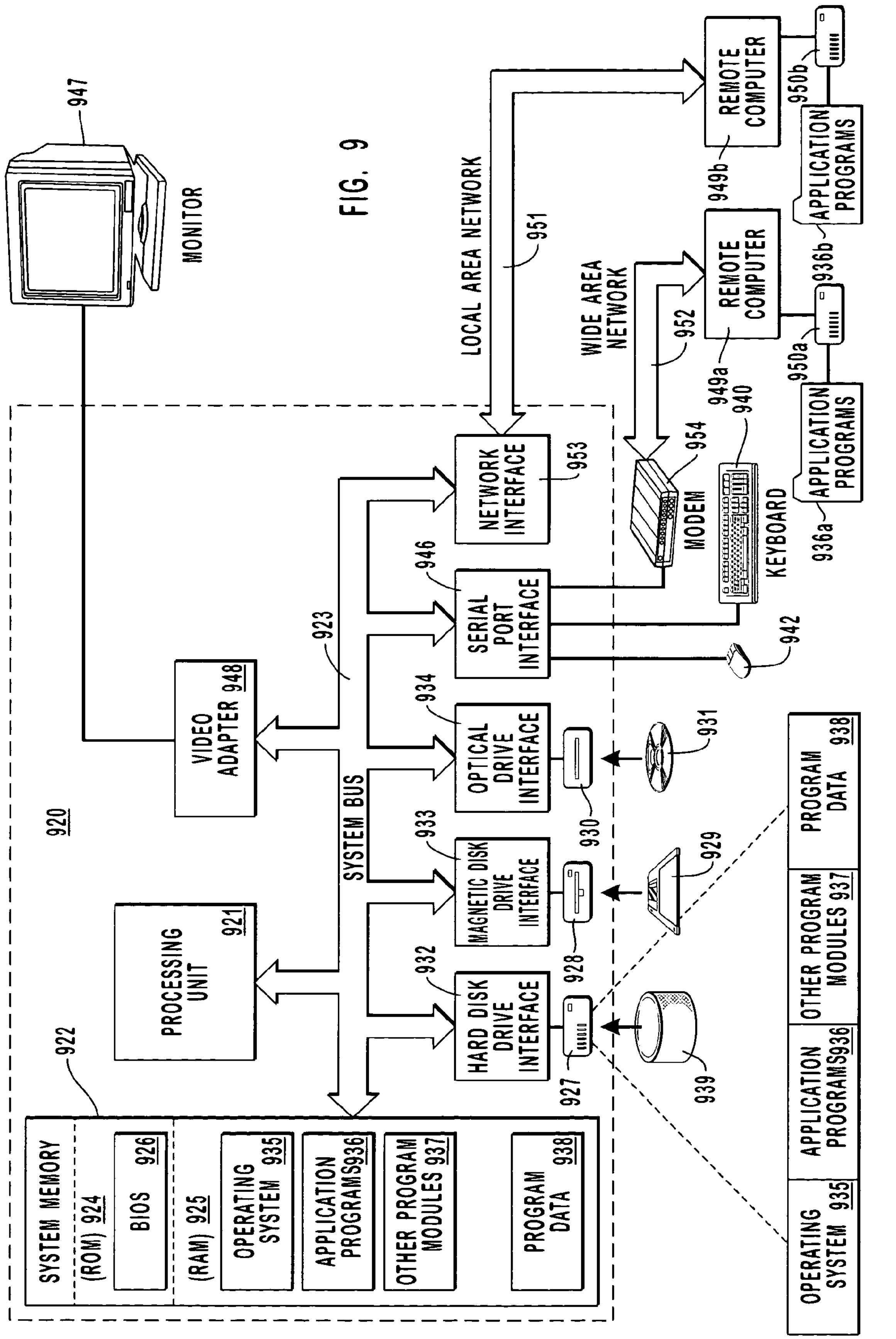
FIG. 9 illustrates an example system that provides a suitable operating environment for the present invention.

FIG. 9 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 9, an exemplary system for implementing the invention includes a general purpose computing device in the form of a conventional computer 920, including a processing unit 921, a system memory 922, and a system bus 923 that couples various system components including the system memory 922 to the processing unit 921.

The system bus 923 may be any of several types of bus structures including a memory bus or memory controller, a peripheral bus, and a local bus using any of a variety of bus architectures. The system memory includes read only memory (ROM) 924 and random access memory (RAM) 925. A basic input/output system (BIOS) 926, containing the basic routines that help transfer information between elements within the computer 920, such as during start-up, may be stored in ROM 924.

The computer 920 may also include a magnetic hard disk drive 927 for reading from and writing to a magnetic hard disk 939, a magnetic disk drive 928 for reading from or writing to a removable magnetic disk 929, and an optical disk drive 930 for reading from or writing to removable optical disk 931 such as a CD-ROM or other optical media. The magnetic hard disk drive 927, magnetic disk drive 928, and optical disk drive 930 are connected to the system bus 923 by a hard disk drive interface 932, a magnetic disk drive-interface 933, and an optical drive interface 934, respectively. The drives and their associated computer-readable media provide nonvolatile storage of computer-executable instructions, data structures, program modules and other data for the computer 920. Although the exemplary environment described herein employs a magnetic hard disk 939, a removable magnetic disk 929 and a removable optical disk 931, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 939, magnetic disk 929, optical disk 931, ROM 924 or RAM 925, including an operating system 935, one or more application programs 936, other program modules 937, and program data 938. A user may enter commands and information into the computer 920 through keyboard 940, pointing device 942, or other input devices (not shown), such as a microphone, joy stick, game pad, satellite dish, scanner, or the like. These and other input devices are often connected to the processing unit 921 through a serial port interface 946 coupled to system bus 923. Alternatively, the input devices may be connected by other interfaces, such as a parallel port, a game port or a universal serial bus (USB). A monitor 947 or another display device is also connected to system bus 923 via an interface, such as video adapter 948. In addition to the monitor, personal computers typically include other peripheral output devices (not shown), such as speakers and printers.

The computer 920 may operate in a networked environment using logical connections to one or more remote computers, such as remote computers 949*a* and 949*b*. Remote computers 949*a* and 949*b* may each be another personal computer, a server, a router, a network PC, a peer device or other common network node, and typically include many or all of the elements described above relative to the computer 920, although only memory storage devices 950*a* and 950*b* and their associated application programs 936*a* and 936*b* have been illustrated in FIG. 9. The logical connections depicted in FIG. 9 include a local area network (LAN) 951 and a wide area network (WAN) 952 that are presented here by way of example and not limitation. Such networking environments are commonplace in office-wide or enterprise-wide computer networks, intranets and the Internet.

When used in a LAN networking environment, the computer 920 is connected to the local network 951 through a network interface or adapter 953. When used in a WAN networking environment, the computer 920 may include a modem 954, a wireless link, or other means for establishing communications over the wide area network 952, such as the Internet. The modem 954, which may be internal or external, is connected to the system bus 923 via the serial port interface 946. In a networked environment, program modules depicted relative to the computer 920, or portions thereof, may be stored in the remote memory storage device. It will be appreciated that the network connections shown are exemplary and other means of establishing communications over wide area network 952 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. In a distributed computing system capable of synchronizing data between devices, a method of preserving memory resources by selecting property values to be assigned time-date information used in resolving conflicts between sync values, the method comprising acts of:

receiving a plurality of property values from a remote device;

selecting a limited set of property values from among the plurality of property values based on the available resources of the remote device;

identifying a set of time-date information from a plurality of time-date information corresponding to the plurality of property values, each of the property values in the limited set corresponding to a different portion of the set of time-date information and indicating when each of the property values within the limited set where last modified by a user;

storing the different portions of time-date information in a remote database of the remote device, identifying a portion of time-date information from the plurality of time-date information for one or more remaining property values from the plurality of property values, the one or more remaining property values not being in the limited set of property values, and the portion of time-date information corresponding to when at least one of the one or more remaining property values where modified by a user; and storing the identified portion of time-date information in one location in the remote database such that the identified portion of time-date information corresponds to all of the one or more remaining property values.

2. The method of claim 1 wherein the one or more remaining property values are represented by a combined representation value.

3. The method of claim 2, wherein the combined representation value is a hash of the remaining portion of property values.

4. The method of claim 2, wherein the identified portion of time-date information for the one or more remaining property values most recently time-date value, oldest time-date value, or both.

5. The method of claim 4, wherein the portion of time-date information for the one or more remaining property values is one or more of a Hexadecimal number of the time-date information, stored down to the seconds, stored down to the minutes or stored in a time zone independent format.

6. The method of claim 2, wherein each of the property values in the limited set are stored as a representation of the corresponding property value.

7. The method of claim 6, wherein the representation of the corresponding property values are a hash of the corresponding property value.

8. The method of claim 1, wherein each of the property values in the limited set are stored as a representation of the corresponding property value.

9. The method of claim 8, wherein the representation of the corresponding property values are a hash of the corresponding property value.

10. The method of claim 1, wherein the time-date information is one or more of a Hexadecimal number of the time-date information, stored down to the seconds, stored down to the minutes or stored in a time zone independent format.

11. The method of claim 1 wherein the available resources is a limited size of a field.

12. The method of claim 1, wherein the selection of the limited set of property values is also based historical information associated with the modification of the plurality of property values.

13. The method of claim 12, wherein the historical information is the frequency for which each of the plurality of property values are modified, and wherein the most frequently modified property values are selected.

14. The method of claim 12, wherein the historical information is time-date information for the plurality of property values, and wherein the most recently modified property values are selected.

15. In a distributed computing system capable of synchronizing data between devices, a computer program product for implementing a method of preserving memory resources by selecting property values to be assigned time-date information used in resolving conflicts between sync values, computer program product comprising one or more computer readable media having stored thereon computer executable instructions that, when executed by a processor, can cause the distributed computing system to perform the following:

- receive a plurality of property values from a remote device;
- select a limited set of property values from among the plurality of property values based on the available resources of the remote device;
- identify a set of time-date information from a plurality of time-date information corresponding to the plurality of property values, each of the property values in the limited set corresponding to a different portion of the set of time-date information and indicating when each of the property values within the limited set where last modified by a user;
- store the different portions of time-date information in a remote database of the remote device;
- identify a portion of time-date information from the plurality of time-date information for one or more remaining property values from the plurality of property values, the one or more remaining property values not being in the limited set of property values, and the portion of time-date information corresponding to when at least one of the one or more remaining property values where modified by a user; and
- store the identified portion of time-date information in one location in the remote database such that the identified portion of time-date information corresponds to all of the one or more remaining property values.

16. The computer program product of claim 15, wherein the one or more remaining property values are represented by a combined representation value.

17. The computer program product of claim 16, wherein the combined representation value is a hash of the remaining portion of property values.

18. The computer program product of claim 16, wherein the identified portion of time-date information for the one or more remaining property values most recently time-date value, oldest time-date value, or both.

19. The computer program product of claim 18, wherein the portion of time-date information for the one or more remaining property values is one or more of a Hexadecimal number of the time-date information, stored down to the seconds, stored down to the minutes or stored in a time zone independent format.

20. The computer program product of claim 16, wherein each of the property values in the limited set are stored as a representation of the corresponding property value.

21. The computer program product of claim 20, wherein the representation of the corresponding property values are a hash of the corresponding property value.

22. The computer program product of claim 15, wherein each of the property values in the limited set are stored as a representation of the corresponding property value.

23. The computer program product of claim 22, wherein the representation of the corresponding property values are a hash of the corresponding property value.

24. The computer program product of claim 15, wherein the time-date information is one or more of a Hexadecimal number of the time-date information, stored down to the seconds, stored down to the minutes or stored in a time zone independent format.

25. The computer program product of claim 15, wherein the available resources is a limited size of a field.

26. The computer program product of claim 15, wherein the selection of the limited set of property values is also based historical information associated with the modification of the plurality of property values.

27. The computer program product of claim 26, wherein the historical information is the frequency for which each of the plurality of property values are modified, and wherein the most frequently modified property values are selected.

28. The computer program product of claim 27, wherein the historical information is time-date information for the plurality of property values, and wherein the most recently modified property values are selected.

29. In a distributed computing system capable of synchronizing data between devices, a computer program product for implementing a method of preserving memory resources by selecting property values to be assigned time-date information used in resolving conflicts between sync values, computer program product comprising one or more computer readable media having stored thereon computer executable instructions that, when executed by a processor, can cause the distributed computing system to perform the following:

- receive a plurality of property values from a remote device;
- select a limited set of property values from among the plurality of property values based on the available resources of the remote device;
- identify a set of time-date information from a plurality of time-date information corresponding to the plurality of property values, each of the property values in the limited set corresponding to a different portion of the set of time-date information and indicating when each of the property values within the limited set where last modified by a user, wherein the time-date information is one or more of a Hexadecimal number of the time-date information, stored down to the seconds, stored down to the minutes or stored in a time zone independent format; and store the different portions of time-date information in a remote database of the remote device.

30. The computer program product of claim 29, wherein the selection of the limited set of property values is also based historical information associated with the modification of the plurality of property values.

* * * * *